United States Patent
Keusenkothen et al.

(10) Patent No.: US 8,986,639 B2
(45) Date of Patent: Mar. 24, 2015

(54) DENOX TREATMENT FOR A REGENERATIVE PYROLYSIS REACTOR

(75) Inventors: Paul Keusenkothen, Houston, TX (US); Frank Hershkowitz, Basking Ridge, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 14/116,398

(22) PCT Filed: Apr. 10, 2012

(86) PCT No.: PCT/US2012/032903
§ 371 (c)(1),
(2), (4) Date: Dec. 19, 2013

(87) PCT Pub. No.: WO2012/161876
PCT Pub. Date: Nov. 29, 2012

(65) Prior Publication Data
US 2014/0105802 A1    Apr. 17, 2014

Related U.S. Application Data

(60) Provisional application No. 61/490,484, filed on May 26, 2011.

(30) Foreign Application Priority Data

Aug. 18, 2011   (EP) .................................. 11177898

(51) Int. Cl.
| | | |
|---|---|---|
| *B01D 53/56* | (2006.01) | |
| *B01D 53/74* | (2006.01) | |
| *B01D 53/86* | (2006.01) | |
| *C10G 9/26* | (2006.01) | |

(52) U.S. Cl.
CPC .............. *B01D 53/8625* (2013.01); *C10G 9/26* (2013.01); *C10G 2300/405* (2013.01); *C10G 2400/20* (2013.01); *C10G 2400/24* (2013.01)

USPC ........ 423/235; 423/239.1; 422/168; 422/177; 422/180; 422/619

(58) Field of Classification Search
USPC ........ 423/235, 239.1; 422/168, 177, 180, 619
See application file for complete search history.

(56) References Cited

U.S. PATENT DOCUMENTS

| | | | |
|---|---|---|---|
| 2,377,847 A | | 6/1945 | Allen et al. |
| 2,845,335 A | | 7/1958 | Hasche |
| 2,875,148 A | | 2/1959 | Scofield |
| 3,192,009 A | * | 6/1965 | Grosspietsch et al. ........ 423/235 |
| 3,703,355 A | | 11/1972 | Takahashi et al. |
| 3,900,554 A | | 8/1975 | Lyon |
| 5,985,222 A | | 11/1999 | Sudduth et al. |
| 6,018,090 A | * | 1/2000 | Schmidt ....................... 588/318 |
| 6,551,565 B2 | | 4/2003 | Confuorto et al. |
| 2003/0184320 A1 | | 10/2003 | Breen et al. |
| 2007/0191664 A1 | | 8/2007 | Hershkowitz et al. |
| 2008/0142409 A1 | | 6/2008 | Sankaranarayanan et al. |
| 2009/0008292 A1 | * | 1/2009 | Keusenkothen et al. ....... 208/81 |
| 2010/0293926 A1 | | 11/2010 | Perry et al. |
| 2013/0211165 A1 | * | 8/2013 | Lattner et al. ................. 585/324 |
| 2013/0251608 A1 | * | 9/2013 | Chun et al. .................... 422/619 |

FOREIGN PATENT DOCUMENTS

EP    0 365 899    5/1990

OTHER PUBLICATIONS

Ind. Eng. Chem. Res., 2001, 40, pp. 515-521.
Yurii Sh Matros et al., "Reverse-Flow Operation in Fixed Bed Catalytic Reactors" Catalysis Reviews Science and Engineering, vol. 38, No. 1, pp. 1-68.

* cited by examiner

*Primary Examiner* — Timothy Vanoy (57) ABSTRACT

A process of introducing a NOx reduction fluid into combustion products within a downstream end of a regenerative pyrolysis reactor. This NOx reduction fluid may thermally reduce NOx contained therein. The NOx reduction fluid may include ammonia.

23 Claims, 4 Drawing Sheets

DENOX TREATMENT FOR A REGENERATIVE PYROLYSIS REACTOR

PRIORITY CLAIM

This application is a national stage filing of International Patent Cooperation Treaty Application No. PCT/US2012/032903, filed Apr. 10, 2012, which claims priority from U.S. Ser. No. 61/490,484, filed May 26, 2011 and European Application No. 11177898.1, filed Aug. 18, 2011, the disclosure of which is fully incorporated herein by reference.

FIELD OF THE INVENTION

This invention is directed to reduction of NOx levels in combustion products emanating from a pyrolysis reactor. In particular, the NOx reduction may involve the introduction of a NOx reduction fluid that promotes reduced NOx levels in the stream.

BACKGROUND OF THE INVENTION

Combustion effluents may be a source of air pollution when discharged into the is atmosphere. Accordingly, the effluents or waste products are treated to remove certain contaminates. One contaminate is nitrogen dioxide ($NO_2$). Certain chemical manufacturing processes, such as nitric acid synthesis, produce waste effluents which contain $NO_2$. Another source of $NO_2$ is from NO formed by combustion processes, which is produced by internal combustion engines in automobiles, stationary sources, such as power plants, process furnaces, incinerators and the like. In these combustion processes, part of the oxygen combines with atmospheric nitrogen in the flame rather than with the fuel. Because NO is the only oxide of nitrogen that is stable at high temperatures, NO is the predominant oxide of nitrogen formed by combustion. Under ambient conditions, the equilibrium $2NO+O_2 \leftrightarrow 2 NO_2$ favors $NO_2$. However, at the concentrations of nitrogen oxides normally found in combustion waste gases, this reaction is typically a slow process. Hence, NO formed by combustion is generally discharged into the atmosphere as NO and only subsequently is converted to $NO_2$.

There have been considerable efforts to determine effective ways to remove oxides of nitrogen (NOx) from combustion waste gases. Ammonia is commonly used as a reactant for the removal of nitrogen oxides from gas streams. When it is injected, it reacts with nitric oxide (NO) to form $N_2$ and $H_2O$ and thereby reduces the emissions of the undesirable nitrogen oxides. It is typically used in concentrations similar to the NO concentration.

Two common methods are used to speed the reactions between ammonia $NH_3$ and NO. In one method, high temperatures of about 871° C. to 1038° C. are used to speed the reaction. After this reaction, the gases, if they are from combustion in a boiler, pass through several heat exchange devices and eventually exit the stack at temperatures in the range of about 132° C. to 188° C. The gases from some older boilers may exit the stack at higher temperatures, but for efficiency it is necessary to have low stack temperatures. This type of process is known as Thermal DeNOx or Selective Non-Catalytic Reduction (SNCR).

In a second method, a catalyst is used to speed the reaction, which is known as Selective Catalytic Reduction (SCR). This method may involve the use of a catalyst bed and $NH_3$ being exposed to temperatures around 371° C. Subsequent to the reduction of NOx, the gas stream is cooled to temperatures in the range of about 132° C. to 188° C. In another variation of this method, a hydrocarbon is utilized instead of $NH_3$ to speed the reaction, as described in Ind. Eng. Chem. Res., 2001, 40, pp. 515-521. In this variation, the catalyst bed and hydrocarbon may be exposed to temperatures of about 200° C. to 400° C.

The prior techniques concerning NO reduction generally deal with the catalytic reduction of NO, which are subject to the usual disadvantages of employing catalysts. These disadvantages include the expense of the catalyst, the problems with loss of activity during operations, the expense and difficulty of contacting the combustion effluents (e.g., combustion products) with the catalyst, the disintegration of the catalyst, the emissions of disintegrated catalyst as a pollutant and similar problems.

As an example, U.S. Pat. No. 2,845,335 describes a regenerative pyrolytic process that involves conversion of a vapor phase via catalytic and non-catalytic techniques. The process uses endothermic and exothermic steps to produce products, such as olefins and acetylenes, from the gaseous starting materials.

U.S. Pat. No. 3,900,554, incorporated herein by reference, discloses a method for reducing the concentration of NO from combustion effluents. The method describes a step of contacting an effluent stream containing NO contamination with a sufficient amount of ammonia in the presence of a sufficient amount of $O_2$ and at a sufficient temperature to selectively reduce the NO from the combustion effluent.

U.S. Patent App. Pub. No. 2010/0293926 discloses a method for reducing the concentration of NO from combustion effluents. The method comprises the step of contacting an effluent stream containing NO contamination with a sufficient amount of hydrocarbon in the presence of a sufficient amount of $O_2$ and at a sufficient temperature to selectively reduce the NO from the combustion effluent in a gasoline fueled spark engine using engine out hydrocarbons.

U.S. Pat. No. 5,985,222 discloses gas-phase methods and systems for reducing NOx emissions and other contaminants in exhaust gases, and industrial processes using the same. The hydrocarbon(s) autoignite and autothermally heat an exhaust gas from an industrial process so that $NH_3$, HNCO or a combination thereof are effective for selectively reducing NOx autocatalytically. Preferably, the reduction of NOx is initiated/driven by the autoignition of hydrocarbon(s) in the exhaust gas. Within the temperature range of about 482° C. to 871° C., the introduced hydrocarbon(s) autoignite spontaneously under fuel-lean conditions of about 2 to 18% $O_2$ in the exhaust gas. Once ignited, the reactions proceed autocatalytically, heating the exhaust gas autothermally.

U.S. Pat. No. 6,551,565 discloses a process for removing nitrogen oxides from flue gases of a fluidized catalytic cracking unit wherein the flue gas is introduced into a tertiary cyclone with percentages of separated solids being discharged in both the overflow and underflow from the cyclone, treating the overflow in a catalytic reduction unit to form an outlet gas and treating the underflow and outlet gas in a wet scrubber.

U.S. Patent App. Pub. No. 2003/0184320 discloses a tubular probe which has spaced-apart bands or patches of the same material as the probe body attached to the probe body by an electrically insulating, high temperature material. A series of cooling tubes are provided within the probe body to direct cold air to the regions near each band. One or more probes are placed in a furnace or boiler above an ammonia injection zone.

While the prior art describes various NOx reduction techniques, a technique for NOx reduction that involves combustion products associated with high temperature pyrolysis is needed. In particular, a need exists for managing the NOx from gases resulting from processes utilizing combustion to generate heat, such as from pyrolysis reactors, in particular in regenerative pyrolysis reactors wherein unusually high temperature combustion occurs.

SUMMARY OF THE INVENTION

The present techniques involve reducing nitrogen-oxides (NOx) produced in a pyrolysis reaction, such as in pyrolysis of hydrocarbons to produce light olefins, which may be reduced without employing catalytic conversion of nitrogen oxides. In particular, these techniques may be utilized to reduce NOx in regenerative pyrolysis reactors that involve high reaction temperatures.

In a first embodiment, the present techniques provide a process for reducing NOx. The process comprises mixing a NOx reduction fluid with combustion products within a regenerative pyrolysis reactor downstream of a combustion mixing zone, wherein the NOx reduction fluid reacts with NOx contained in the combustion products to reduce the amount of NOx in the combustion products. The process may comprise passing one or more combustion streams through a reactor bed in a first direction during a heating step and reacting the combustion streams within the combustion mixing zone to form the combustion products. The NOx reduction fluid is mixed with the combustion products at a temperature in the range of 1000° C. to 1600° C. or a temperature in the range of 1200° C. to 1400° C. The NOx reduction fluid may be ammonia. The process may further comprise passing the combustion products to an external NOx tower downstream of the regenerative pyrolysis reactor and reducing the amount of NOx contained in the combustion products in the external NOx tower.

The process may also include process management techniques. That is, in one or more embodiments, the process may comprise monitoring the composition of the combustion products downstream of the reactor and adjusting the flow rate of the NOx reduction fluid to the regenerative pyrolysis reactor based on the monitored composition. The process may also include monitoring the composition of the combustion products downstream of the reactor and adjusting the flow rate of the NOx reduction fluid to the external NOx tower based on the monitored composition.

In another embodiment, a pyrolysis system is described. The system comprises a regenerative pyrolysis reactor having a combustion mixing zone within the regenerative pyrolysis reactor; a NOx reduction mixing zone within the regenerative pyrolysis reactor; and a NOx reduction fluid source in fluid communication with the regenerative pyrolysis reactor and configured to provide a NOx reduction fluid to the NOx reduction mixing zone of the regenerative pyrolysis reactor. The regenerative pyrolysis reactor comprises a first reactor bed coupled in series with a second reactor bed, and a NOx sparger disposed within the second reactor bed and configured to provide the NOx reduction fluid to the NOx reduction mixing zone of the regenerative pyrolysis reactor. Further, the NOx sparger may be positioned to direct the NOx reduction fluid in a counter-current direction from the combustion products.

In other embodiments, equipment may be utilized to manage the operation of the system. Accordingly, the system may include a reactor composition measurement device downstream of the regenerative pyrolysis reactor and configured to monitor the composition of the combustion products downstream of the regenerative pyrolysis reactor and transmit the reactor monitored data; and a process control unit in communication with the reactor composition measurement device and configured receive the reactor monitored data, determine the NOx content of the combustion products, and indicate an adjustment to a flow rate of the NOx reduction fluid to the regenerative pyrolysis reactor based on the determined NOx content. In other embodiments, the system may include a tower composition measurement device downstream of the external NOx tower and configured to monitor the composition of the combustion products downstream of the external NOx tower and transmit the tower monitored data; and a process control unit in communication with the reactor composition measurement device and configured receive the tower monitored data, determine the NOx content of the combustion products, and indicate an adjustment to a flow rate of the NOx reduction fluid to the external NOx tower based on the determined NOx content.

BRIEF DESCRIPTION OF THE DRAWINGS

The figures disclosed herein are provided by way of example, and not by way of limitation, and like reference numerals refer to similar elements.

The invention will be described in connection with its preferred embodiments of the present techniques. However, to the extent that the following detailed description is specific to a particular embodiment or a particular use, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE INVENTION

The present techniques involve a process and apparatus configured to reduce NOx levels from combustion products for a pyrolysis reactor system as compared to the NOx levels of unaltered combustion products. That is, the combustion products are produced with lower levels of NOx by introducing NOx reduction fluids (e.g., ammonia) downstream of the mixing zone and within the reactor. The process may also include the use of NOx reduction fluid downstream of the reactor to further reduce NOx levels. Accordingly, in certain embodiments, the NOx reduction technology may be utilized with an additional NOx reduction step for combustion products downstream of the reactor. This combination may be beneficial to further reduce NOx, which may include thermal DeNOx chemistry within the reactor and catalytic DeNOx chemistry downstream of the reactor.

While the process may be utilized for any reactor, the process of the present techniques is particularly suited to pyrolysis reactors that include a regenerative reactor or regenerative reverse-flow reactor. For instance, the regenerative reverse-flow reactor may have at least two reactor beds in fluid communication with each other and in series, one with the other. The present techniques may be particularly beneficial for pyrolysis processes that utilize a cyclical process that involves repeating a heating step, pyrolysis step and any other steps, if any, in each cycle.

The NOx reduction fluid may be introduced in a variety of different methods within the reactor. For instance, the NOx reduction fluid (e.g., ammonia) may flow through honeycomb channels within the reactor into a NOx reduction mixing zone. The NOx reduction fluid mixes with counter-current flowing hot combustion products (e.g., flue gases) at a temperature range from about 1000° C. to about 1600° C., or in the range of 1200° C. to 1400° C. Thermal DeNOx chemistry reduces the NOx levels in the combustion products, and lowers the cost of, or even eliminates NOx reduction processing downstream of the reactor.

Additionally, catalyst may be utilized with the process to further enhance the NOx reduction. The catalyst may be utilized within certain locations within the reactor or downstream of the reactor. As an example, the walls of the honeycombs at the exiting side of the combustion products may include a DeNox catalyst selected from Groups IB, IVB, VB, VIIIB and IIA of The Periodic Table of Elements (including but not limited to Ti, V, and W oxides). The "Periodic Table of the Elements" means the Periodic Chart of the Elements as tabulated on the inside cover of The Merck Index, 12th Edition, Merck & Co., Inc., 1996. The catalyst may be applied via washcoating or other suitable application methods. In operation, the catalyst may be exposed to temperatures in the range of 100° C. to 600° C.

I. Reactor

A reactor refers to equipment used for chemical conversion. As such, several items identified as reactors may be combined to become a single entity that is also identified as a reactor, in that individual and combined entities may be characterized as equipment used for chemical conversion.

The term "pyrolysis reactor system", as used herein, refers to a system for converting hydrocarbons by means of at least pyrolysis chemistry. The pyrolysis reactor system may include one or more reactors and/or associated equipment and lines. A zone, as used herein, refers to a location within the pyrolysis reactor system, which may include one or more reactors and/or associated equipment and lines. The zone may include a specific volume within a reactor, a specific volume between two reactors and/or the combination of different disjointed volumes in one or more reactors.

As used herein, the "thermal pyrolysis reactor" includes at least predominantly pyrolysis chemistry. Pyrolysis or pyrolysis chemistry, such as the conversion of hydrocarbons to unsaturates such as ethylene and acetylene, is an endothermic process requiring addition of heat. The terms crack and cracking may be used interchangeably with the terms pyrolyze and pyrolysis. In a thermal pyrolysis reaction, greater than or equal to ($\geq$) 50%, $\geq$80%, or $\geq$90% of this heat is provided by heat transfer via solid surfaces, such as tubulars or bed materials. Any combustion chemistry that occurs within the pyrolysis stream of a thermal pyrolysis reactor provides a minority of the endothermic heat of pyrolysis, such as less than (<) 50%, <20%, or <10% of the endothermic heat of pyrolysis.

The reaction zone is a location in the pyrolysis system where $\geq$50%, $\geq$75% or $\geq$90% of the conversion of hydrocarbons into $C_2$ unsaturates in the pyrolysis system is performed. That is, while some thermal cracking may occur upstream of the reaction zone, the reaction zone is the location or volume within the reactor where a substantial amount of the smaller molecules are produced from the initial hydrocarbons provided to the reactor (e.g., pyrolysis occurs). For example, the reaction zone for a steam cracking system is in the radiant tubes of the steam cracking furnace, while the reaction zone may be a location between the reactor beds for a regenerative reverse-flow reactor, which is the location that has the highest temperature within the reactor. The reaction zone for a regenerative reactor may include a portion of the reactor beds near the central location and any mixing components disposed between the reactor beds.

The regenerative pyrolysis reactors, such as regenerative reverse-flow pyrolysis reactors, described herein may comprise a first pyrolysis reactor and a second pyrolysis reactor, for example as described in U.S. Patent App. Pub. No. 2007/0191664. Other examples are described in U.S. Pat. No. 7,491,250, U.S. Patent Ser. No. 61/349,464 and U.S. Patent App. Pub. Nos. 2007/0144940 and 2008/0142409.

The term "high-severity operating conditions" means pyrolysis conditions resulting in the conversion of a pyrolysis feed of methane to make a product having an acetylene content $\geq$10.0 weight percentage (wt %) based on the weight of the hydrocarbons in the pyrolysis feed. The operating conditions for a thermal pyrolysis reactor may be characterized by a severity threshold temperature that divides low-severity operating conditions in thermal pyrolysis reactors from high-severity operating conditions in thermal pyrolysis reactors. The severity threshold temperature is defined as the lowest temperature at which the feed to the reactor may react at a residence time $\leq$0.1 sec (second) to make at least 10 wt % acetylene as a percent of the hydrocarbons in the feed evaluated at the given operating conditions of the process. The high-severity operating conditions for a thermal pyrolysis reactor may be characterized as peak pyrolysis gas temperatures that are greater than the severity threshold temperature. The low-severity thermal pyrolysis reactor may be characterized as pyrolysis gas temperatures that are less than the severity threshold temperature and no pyrolysis gas temperatures that exceed the severity threshold temperature. For example, for the thermal conversion of methane at a pressure of 14.7 pounds per square inch gauge (psig) (101 kilo Pascals (kPa)) and with 2:1 molar ratio of hydrogen diluent, the threshold temperature is about 1274° C. for this process. At temperatures at or above 1274° C., yields of acetylene can exceed 10 wt % of the starting methane, at some time less than or equal to ($\leq$) 0.1 seconds. Conversely, at temperatures below 1274° C., there are no times $\leq$0.1 seconds for which yields of acetylene reaches 10 wt % of the starting methane. A similarly-defined severity threshold temperature may be used to distinguish between high-severity and low-severity types of other reactors, such as partial combustion, indirect combustion, and arc processes. That is, if that reactor operation is capable of converting the hydrocarbon feed to $\geq$10% acetylene at a residence time of $\leq$0.1 seconds, that reactor is considered a high-severity reactor.

Regenerative pyrolysis reactors are known and conventionally used for converting or cracking reactions, and to execute cyclic, high temperature chemistry, such as those reactions that may be performed at temperatures higher than can suitably be performed in conventional steam crackers. Regenerative reactor cycles typically are either symmetric (same chemistry or reaction in both directions) or asymmetric (chemistry or reaction changes with step in cycle). Asymmetric cycles are typically used to execute endothermic chemistry, and the desired endothermic chemistry is paired with a different chemistry that is exothermic (typically combustion) to provide heat of reaction for the endothermic reaction.

As with steam crackers, regenerative pyrolysis reactors also are well suited for volatized or volatizable feedstocks that are substantially free of non-combustible components, such as metals and other residual or nonvolatizable components, which otherwise lay down and build up in the reactor as ash. Non-volatiles may be defined broadly to mean any resid, metal, mineral, ash-forming, asphaltenic, tar, coke, or other component or contaminant within the feedstock that will not vaporize below a selected boiling point or temperature and which, during or after pyrolysis, may leave an undesirable residue or ash within the reactor system, which is difficult to remove.

Regenerative reverse-flow reactors may involve multiple steps repeated in sequence to form a cycle for the process. That is, the pyrolysis process may include two or more sequential steps, which include a heating step to heat the reaction zone and a pyrolysis step that converts the hydrocarbons into the reactor product. The steps may involve passing streams over a solid material in fixed orientation (e.g., one or more reactor beds), which utilizes valves to alternate introduction of hydrocarbon and/or combustion streams into the internal portion of the reactor. As an example, regenerative reactors typically deliver a stream of fuel, oxidant, or a supplemental amount of one of these reactants, directly to a location along the flow path within the reactor (e.g., a reaction zone or a combustion mixing zone within or associated with the reaction zone). The delivered reactants then exothermically react (combust) therein and heat the reaction zone. Thereafter, the exothermic reaction products (e.g., combustion products) are exhausted and a pyrolysis feed, such as a vaporized hydrocarbon stream, is introduced into the reactor in the opposite direction, and exposed to the heated media to cause heating and pyrolysis of the hydrocarbons in the pyrolysis stream. The pyrolyzed reactor products are then removed from the reaction zone and quenched in a quench zone of the reactor to halt the pyrolysis reactions and yield pyrolysis reactor products. During the quenching, the quench zone absorbs heat from the pyrolysis reactor products, sufficient to impart heat into the combustion reactants when the flow is again reversed.

The high-severity operating conditions may include peak pyrolysis gas temperatures between 1200° C. and 2200° C., preferably between 1400° C. and 1900° C. In particular, for reactors with an isothermal heat profile, the temperatures may be between 1450° C. and 1700° C., or between 1540° C. and 1650° C. For reactors with a Gaussian like heat profile, the peak pyrolysis gas temperatures may be in the range of 1540° C. to 2200° C. or 1600° C. to 1800° C. Further, the preferred operating pressures may include pressures $\geq 4$ psig (28 kPa), $\geq 15$ psig (103 kPa), $\geq 36$ psig (248 kPa), $\geq 44$ psig (303 kPa) or $\geq 103$ psig (710 kPa), but may be $\leq 300$ psig (2068 kPa), $\leq 163$ psig (1124 kPa), or $\leq 150$ psig (1034 kPa). As noted above, residence times may be $\leq 0.5$ second, $\leq 0.3$ second and preferably $\leq$ about 50 milliseconds or in the range of 0.001 to 1.0 seconds or in the range of 0.5 second and 0.001 second. For a regenerative reactor, the process may operate at cycle times in the range of 1 to 240 seconds, in the range of 1 to 60 seconds, in the range of 2 to 40 seconds, in the range of 2 seconds to 20 seconds, or even in the range of 3 seconds to 10 seconds.

Also, as may be appreciated, these different pressures and temperatures may be combined together to form different combinations depending on the specific configuration of equipment. Further, for a regenerative reverse flow reactor, the pressure in the pyrolysis step may be similar or different to the pressure in the heating step (e.g., at lower or higher pressure than the pyrolysis step). In addition, the injection of ammonia, for example, into the downstream end of a regenerative pyrolysis reactor and thermally reducing NOx may be performed at any of the above mentioned pressures.

The heating step leaves a profile of temperatures in the solid material, that is, a temperature that varies along the path by which the gases transit the solid material (e.g., refractory material). The shape of that profile depends on many factors, including if and where a heat release (combustion) reaction occurs, the initial temperature distribution, the duration of the heating step, the flow rate and inlet temperature of the gas stream, and the heat capacity and transfer properties of the gas and solid material. On average, the solid material is hottest at the end of the heating step. The pyrolysis step consumes heat and reduces average solid material temperature. The pyrolysis step changes the profile of temperatures in the solid material, in a way that depends on many factors, including where the heat consumption (pyrolysis) reaction occurs, the initial temperature distribution, the duration of the pyrolysis step, the flow rate and inlet temperature of the gas stream, and the heat capacity and transfer properties of the gas and solid. Fixed-solid regenerative pyrolysis reactors do not operate in the steady state. That is, at any given location, the temperature changes. However, these reactors may be in a periodic steady state, meaning that the same cycling of temperatures occurs over and over as the reactor sequentially repeats the heating and pyrolysis steps.

The heat generated from the heating step may preferably be stored in a refractory material, such as a reactor bed or other solid material. The material may be designed to facilitate the process of heat addition and removal. Checker bricks, tiles and monoliths may be used as the solid materials within the reactor. Such materials form a network of passages that are used by the gases in each step to transit the region containing solid material. The refractory material may be a ceramic, which may include yttria, zirconia, alumina, and/or other refractory material capable of withstanding temperatures within the pyrolysis reactor. As a specific example, the reactor may include components comprised of yttria.

In an embodiment, one or more of the reactor beds include separate conduits for separately channeling flow of feed components or regeneration fluid components (e.g., combustion stream components) through the reactor beds. Preferably, each reactor bed includes separate conduits. The separate flow channels in the reactor beds can further comprise flow barriers that effectively function as conduit walls to minimize or prevent cross flow or mixing of fluids between channels. Each reactor bed preferably includes multiple channels, which may preferably be in parallel flow arrangement.

In a particular embodiment, a channeled reactor bed may preferably be comprised of one or more honeycomb monoliths. Preferred honeycomb monoliths are structures that comprise many (e.g., a plurality, meaning more than one) gas flow passages or conduits, arranged in parallel fashion with walls serving to separate each passage or conduit. Such reactor can include a single monolith or a plurality of monoliths. Each monolith can be formed by extruding or die pressing monolith blocks with shaped (e.g., square or hexagonal) cross-section and two- or three-dimensionally stacking, such blocks above, behind, and beside each other. Monoliths are particularly effective as reactor beds because they provide high heat transfer capacity with minimum pressure drop.

Within the reaction zone, the components of the respective streams may intermingle from the separate channels within the reactor bed. That is, the mixing of the components may be performed in an open junction between reactor beds, which is the mixing zone. In other embodiments, the reaction zone may include a mixing zone that has mixing components to enhance the blending or intermingling of the different components of the streams. Accordingly, a mixing component may be located between the reactor beds and configured to intermingle the components of the streams from at least one direction. The mixture is then passed downstream to the next or subsequent reactor component, such as another or second reactor bed. The mixing component is positioned between reactor beds so as to enhance mixing of combustion streams during the heating step. The mixing component is also positioned between reactor beds to enhance distribution of hydrocarbon feed and reactor product during the pyrolysis step.

As noted above, the combustion products may include NOx gases, such as NO, $NO_2$, $N_2O$ and $N_2O_4$. Accordingly, the process may involve introducing a NOx reduction fluid into the reactor downstream of the combustion mixing zone. The NOx reduction fluid may include water, steam, ammonia or other suitable fluids that promote the reduction of NOx levels in the stream. The NOx reduction fluid may utilize Thermal DeNOx chemistry or Selective Catalytic Reduction (SCR) chemistry to reduce the NOx levels in the combustion products.

In one embodiment, the NOx reduction fluid may be provided in a variety of different methods, which may depend upon the NOx reduction technology utilized. For instance, the NOx reduction fluid may be provided at different locations within the reactor based on thermal chemistry or catalytic chemistry. As an example of thermal chemistry, which may involve temperatures in the range of 1000° C. to 1600° C., the NOx reduction fluid may be injected within a NOx reduction mixing zone, which may be a location within a reactor bed and downstream of the combustion mixing zone. That is, for a regenerative reactor, the injection point may be 30% to 50% of the total bed length from the combustion removal components toward the mixing zone; or 50% to 80% of the flow path from mixing zone toward the combustion removal components. In this example, the NOx reduction mixing zone may be a reactor bed configuration that provides the NOx reduction fluid into the channels of the reactor bed and/or may be lines disposed between different sections of the reactor bed downstream of the combustion mixing zone, which are configured to provide the NOx reduction fluid and to intermingle it with the combustion products. As an example of catalytic chemistry, which may involve temperatures in the range of 100° C. to 600° C., the NOx reduction fluid may be injected within a NOx reduction mixing zone, which may be a location adjacent to or at the end of the reactor bed upstream of the combustion removal components and downstream of the combustion mixing zone. In this example, the NOx reduction mixing zone may be a configuration of lines disposed between the combustion removal components and the reactor bed, wherein the lines are configured to provide the NOx reduction fluid and to intermingle it with the combustion products.

Further, the reactor may include one or more lines in different configurations to distribute the NOx reduction fluid within different zones of the reactor downstream of the mixing zone. As a specific example, the reactor may include lines and nozzles configured to provide a specific spray pattern within the reactor. That is, the spray nozzles may be oriented to direct the NOx reduction fluid toward the flow of combustion products or in a counter current flow direction to enhance the mixing of the streams. In addition, the reactor may include a network of conduits or tubes and nozzles coupled together to distribute the NOx reduction fluid to all or portions of the reactor. As an example, the NOx reduction fluid line may be disposed along the outer portion of the reactor with the nozzles directed toward the center of the reactor. This configuration may utilize the flow of the products to distribute the flushing fluid, while minimizing the obstruction to the flow path of the streams flowing through the reactor. In this configuration, the NOx reduction fluid line may be a circular tube around the perimeter of the internal surface of a circular shaped reactor interior or may include different line segments coupled together along the perimeter to form a rectangle for a rectangular shaped reactor interior. In another embodiment, the reactor may include a network of lines coupled together to form a mesh to distribute the NOx reduction fluid in a uniform manner. While this configuration may hinder streams through the reactor, the network may provide enhanced distribution of the NOx reduction fluid.

In an alternative embodiment, at least a portion of the reactor bed and/or other components downstream of the combustion mixing zone may have a surface with DeNOx catalysts. The catalyst may be utilized with the process to further enhance the NOx reduction. As an example, the walls of the honeycombs at the exiting side of the combustion products may include a DeNox catalyst selected from Groups IB, IVB, VB, VIIIB and IIA of The Periodic Table of Elements (including but not limited to Ti, V, and W oxides).

II. Heating Step

The heating step may differ for different embodiments of the present techniques. For example, steam cracking involves using burners to heat tubes to transfer the heat to the pyrolysis stream passing through the tubes of the furnace, which involves simultaneous heating of tubes and pyrolysis of feed. The NOx is not formed inside the internal volume of the tubes as the tubes provide a barrier for the separation of the combustion products and reactor products. For regenerative reactors, the process may include one or more steps in a cycle during hydrocarbon processing mode. One step can be referred to as a heating step (e.g., involving heating and regenerating). Another step can be referred to as the pyrolysis step (e.g., pyrolysis or hydrocarbon conversion mode). These different steps may be performed in sequence to form a cycle, which is then repeated as part of the normal hydrocarbon processing operations. The cycle may be performed continuously, semi-continuously, periodically or even as a batch operation. Accordingly, a cycle includes the time spent in heating step plus time spent in pyrolysis step plus any time needed to switch between steps or for additional steps before the repeat of the sequence. The heating and pyrolysis steps may have equal durations or may be adjusted to have different durations.

In the heating step, combustion feeds are supplied to or injected into a first reactor end zone (e.g., at or adjacent to a first end of a first reactor bed). That is, one or more combustion streams flow through a first reactor end zone, which may be a portion of the first reactor bed and the first interior region of the reactor upstream of the first reactor bed and downstream of the combustion injection components, or only the first interior region (along the flow of the combustion stream). The combustion streams may flow through conduits through a combustion preheat zone (e.g., a portion of the first reactor bed) to the reaction zone, where the combustion streams exothermically react to heat the reaction zone. In another embodiment, one combustion stream may flow through the reactor and the other may be supplied directly to the reaction zone. Preferably, the combustion streams may include a fuel stream and an oxidant stream that are maintained substantially separate until passing to the reaction zone and are capable of reacting together and combusting to supply or generate heat and produce combustion products.

The combustion streams may include two or more individual feeds that are to be combined to form a combustion reaction or a mixture of the two or more feeds, such as a fuel that does not contain oxidants (e.g., $O_2$) or non-combustible non-volatiles and an oxidant that may include an oxygen or oxygen containing fluid. The fuel stream may be a hydrogen-containing composition of hydrogen, hydrocarbon or a mixture thereof. The hydrocarbon can be the same or different from the hydrocarbon used in the pyrolysis feed. Additional or further specific examples of fuel compositions that can be used include, but are not limited to, hydrogen, methane, ethane, ethylene, propane, propene, butane, butene, hexane, heptane, methanol, ethanol, propanol, butanol, dimethyl ether, diethyl ether, liquid natural gas (LNG), liquid petroleum gas (LPG), naphtha, gasoline, kerosene, light gas oil, heavy-oil decomposition components having a final ASTM D 86 boiling point of not greater than 565° C., natural gas, coal bed methane, landfill gas, blast furnace gas, coke oven gas, converter gas, by-product gas derived from a chemical plant, gas obtained by gasification of coal or heavy oil, coal carbonization gas, water gas from the gasification of coal, coal partial-combustion gas, light oil or gas obtained by thermal separation of heavy oil, heavy-oil thermal decomposition light-oil or gas, heavy-oil oxidation decomposition light-oil or gas, super-heavy oil thermal decomposition light-oil or gas, super-heavy oil oxidation decomposition light-oil or gas, fermentation gas, including mixtures of one or more of these substances.

The oxidant stream may include an oxygen composition that has sufficient oxygen content to enable the fuel to combust. Oxidant can be supplied in any form suitable for combustion, such as pure oxygen or in the form of air. The oxidant stream may include, but is not limited to, air, oxygen or mixtures thereof. Any of the fuel or oxidant may additionally include non-combustible but volatile diluents such as $N_2$, $CO_2$, $H_2O$, and/or other inert gases. In an embodiment, the oxidant comprises oxygen in an amount of at least 80% of stoichiometric for complete combustion of fuel composition. Preferably, the oxidant comprises oxygen in a stoichiometric amount for complete combustion, and more preferably in an amount in excess of stoichiometric for complete combustion of the fuel composition in the combustion streams.

The fuel and the oxidant are preferably not mixed until the reaction zone. That is, the combustion streams are flowed to the reaction zone through the combustion preheat zone in separate channels (e.g., a portion of a first reactor bed). For example, the fuel and oxidant can be separately flowed through separate channels of a honeycomb channel arrangement of a first reactor bed. The fuel and oxidant are preferably heated as they flow through the channels. Following heating, the fuel and oxidant are then preferably mixed, with combustion taking place.

At a point downstream of the combustion preheat zone (e.g., the reaction zone), the streams are mixed together to exothermically react to produce combustion products and heat. Preferably, the fuel and oxidant components are mixed together in the mixing component within the pyrolysis reactor in a combustion mixing zone. The combustion streams flow through the combustion preheat zone and exit into the reaction zone (e.g., a portion of the first reactor bed, a portion of second reactor bed and one or more mixing components, if any), where the fuel and oxidant components are mixed together and combusted to produce combustion products and heat. Heat, which is generated from the exothermic reaction of the fuel and oxidant components, is carried along with the downstream flow of combustion products.

The combustion products are then flowed downstream to a combustion heat transfer zone (e.g., a portion of the second reactor bed) with the combustion heat transfer zone absorbing heat produced from the combustion of the combustion streams. The heat is absorbed by the material, noted above, which may include at least a portion of the second reactor bed. This absorbed heat by the material in combustion heat transfer zone is sufficient to enable pyrolysis of the hydrocarbon stream (e.g., hydrocarbons in the pyrolysis feed) that flow through the pyrolysis preheat zone (e.g., a portion of the second reactor bed) in the pyrolysis step, which is discussed further below.

Then, the combustion products flow through the second reactor end zone, which may be a portion of the second reactor bed and a second interior region of the reactor downstream of the second reactor bed and upstream of the combustion removal components, or just the second interior region. This heating and regeneration of the heating step is particularly beneficial in a cyclic process that incorporates both the heating step and the pyrolysis step. Once removed the combustion products may be provided to other units to further process the combustion products to reduce the amount of NOx present in the combustion products.

As noted above, the combustion products may include NOx gases, such as NO, $NO_2$, $N_2O$ and $N_2O_4$. Accordingly, the process may involve introducing a NOx reduction fluid (e.g., ammonia) into the reactor downstream of the combustion mixing zone. The NOx reduction fluid may utilize thermal DeNOx chemistry or selective catalytic reduction (SCR) chemistry to reduce the NOx levels in the combustion products. While this process may be utilized with NOx technology downstream of the reactor, the introduction of the ammonia within the reactor may lower the cost of or even eliminate the need for downstream NOx reduction technology.

The NOx reduction fluid may be provided in a variety of different methods, which may depend upon the NOx reduction technology utilized. For example, the NOx reduction fluid may be introduced along the same flow path as combustion products at a location downstream of the exothermic reaction. Alternatively, the NOx reduction fluid may be mixed via counter-current flow with combustion products. As noted above, the temperature range for the NOx reduction may include temperatures from about 1000° C. to about 1600° C. for thermal chemistry, or may be 100° C. to 600° C. for catalytic chemistry. That is, the present techniques perform the thermal reduction of NOx within the reactor, not in a separate unit.

Further, the NOx reduction fluid may be provided to the process at 1-1.5 stoichiometric excess. The process can be operated with either an excess of oxidant (e.g., oxygen or air) or an excess of fuel (e.g., hydrogen or methane). Accordingly, the process may include a molar ratio in the range of 0.5 and 2 of NOx reduction fluid to NOx in the combustion products, or may be a molar ratio in the range of 1 and 1.5 of NOx reduction fluid to NOx in the combustion products.

As an example, if the NOx reduction fluid is ammonia, it may be intermingled with the combustion products at temperatures from about 1000° C. to about 1600° C. The ammonia can be delivered to the process at 1-1.5 stoichiometric excess, and the process can be operated with either an excess of oxidant (e.g., oxygen or air) or an excess of fuel (e.g., hydrogen or methane).

III. Pyrolysis Step

In the pyrolysis step, pyrolysis feed comprising hydrocarbon, and optionally diluents such as molecular hydrogen ($H_2$), is supplied to or injected into another end of the reactor via pyrolysis injection components. The pyrolysis feed may be supplied to or injected into the pyrolysis reactor following the removal of the combustion products from the heating step, which may include a sweeping or purging step to remove products from the internal regions of the entire reactor. That is, the pyrolysis stream flows through the second reactor end zone, which may be a portion of the second reactor bed and the second interior region of the reactor upstream of the second reactor bed and downstream of the pyrolysis injection components, or only the second interior region (along the pyrolysis stream's flow). This pyrolysis or hydrocarbon stream may be provided at a different end of the reactor from the end that the combustion streams were supplied or injected. The direction of flow of the pyrolysis stream may be counter to the direction of flow of the combustion streams, or in certain embodiments may be in the same direction, which may also involve some alternating patterns of flow.

As the hydrocarbon stream flows through the pyrolysis preheat zone, the temperature along the path of flow increases. As the temperature increases to the appropriate level, pyrolysis of the hydrocarbon in the hydrocarbon stream takes place in a reaction zone (e.g., a portion of the first reactor bed, a portion of second reactor bed and one or more mixing components, if any). Following the reaction zone, the reactor products (e.g., unreacted and reacted hydrocarbons) are flowed through a pyrolysis quenching zone (e.g., a portion of the first reactor bed), which reduces the temperature of the reactor products. The reactor products may flow through channels in the first reactor bed. The reactor products are then removed from the pyrolysis quenching zone to the first reactor end zone, and further passed for processing in recovery units to process and separate one or more of acetylene, ethylene and hydrogen.

In this pyrolysis step, the pyrolysis reaction is carried out relatively quickly to avoid over-cracking so as to avoid excessive formation of undesirable by-products, particularly coke and tar compositions. Accordingly, pyrolysis reactors may be characterized in terms of the residence time of pyrolysis gases in the reactor. Residence time is considered to be the total time from the hydrocarbons entry into the pyrolysis reactor and the corresponding exit of the reactor product from the reactor. Residence time is most generally defined as the time required for some average non-reacting molecule to pass through the pyrolysis reactor or furnace. Residence time may be further defined to be the time spent within the actively heated or cooled portions of the reactor or furnace. This includes time spent within tubulars or heat transfer solids of a furnace or regenerative reactor, respectively, but excludes residence time spent in headers or other means of conveyance to or from the actively heated or cooled regions of the furnace or reactor. An exact calculation of residence time requires measurements with tracer compounds (such as radioactive additives to the feed) or requires a specific knowledge of the temperature and composition of the pyrolysis stream at all times as it passes through the pyrolysis reactor. For the purposes of the present techniques, residence time (in either form) may be approximated using interpolation and extrapolation of discreet composition and temperature measurements, and/or using model-based estimations of temperature and composition, as is known in the art. As an example, the residence time for a regenerative reverse-flow reactor is the time from the exit of the pyrolysis injection component, time traveling through the first reactor bed and second reactor bed and the time to enter into the pyrolysis removal component.

Further, different types of thermal pyrolysis reactors may have different heat profiles. That is, some embodiments of pyrolysis reactors may operate in an isothermal manner with the heat profile being relatively constant. However, other pyrolysis reactors may have a heat profile that is similar to a Gaussian curve. As an example, a regenerative reactor may be characterized by an initial and final temperature of 300° C. and a peak pyrolysis gas temperature of 1700° C. over at a residence time of 35 ms (≤10 ms at temperatures ≥1000° C.).

The quenching zone may include a portion of the first reactor bed, where the endothermic reactions are slowed. That is, average temperature within the quenching zone is less than the average temperature in the reaction zone, such as at least 50° C. or at least 100° C. or at least 200° C. less than the average temperature in the reaction zone. This quenching zone may include temperatures in the range of 1200° C. to 600° C., in the range of 1200° C. to 750° C., or in the range of 1200° C. to 900° C. In the quenching zone, the acetylene reactions may lower the rate of further reactions to produce acetylene and reduce the further reactions that form carbon and other hydrocarbon compounds. The quenching is generally a rapid cooling that involves passing the reactor products through the reactor bed. In certain embodiments, the quenching zone may be actively performed by injecting water, other hydrocarbons oil, solvent or other suitable fluids into reactor.

As may be appreciated, the flow of hydrocarbons is interrupted after a desired or predetermined time and the combustion feeds are provided to again heat the reactor. By repeating the heating step and the pyrolysis step, the overall reaction process can be continuously carried out over a relatively long period of time.

Exemplary Embodiments

Figure 1A:
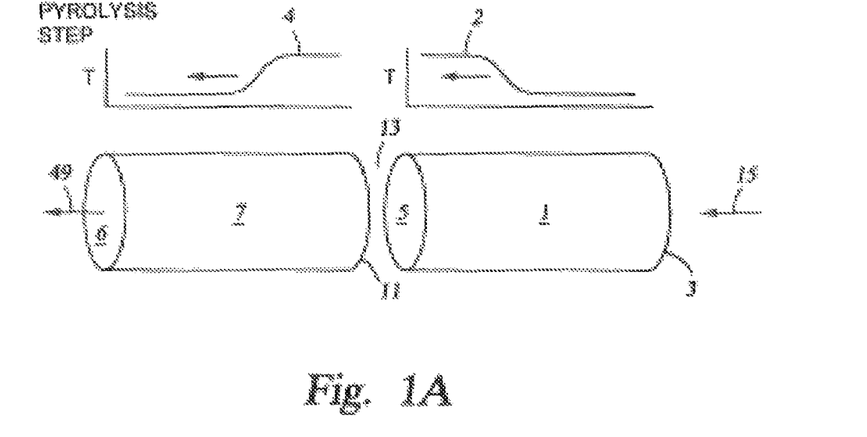
FIGS. 1A and 1B are simplified, diagrammatic illustrations of the two steps in a prior art regenerative reverse flow pyrolysis reactor system.
Figure 1B:
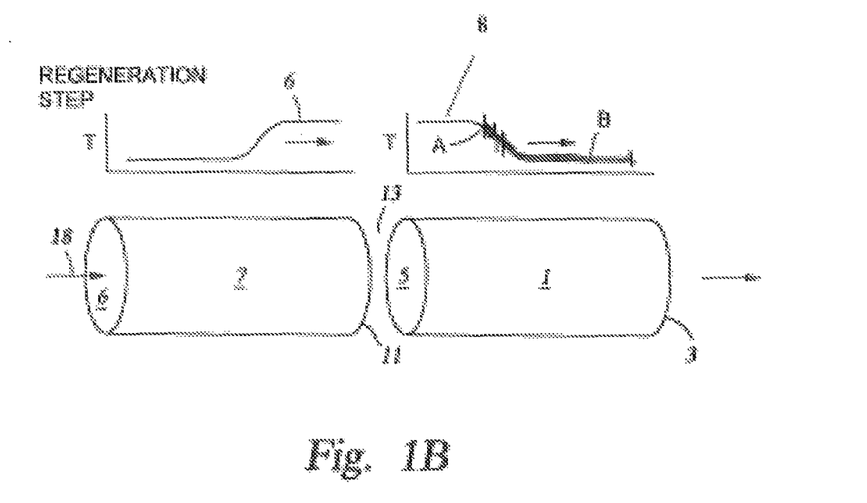

As may be appreciated, various embodiments may be utilized with the present techniques. For instance, a basic two-step asymmetric cycle of a regenerative bed reactor system is depicted in FIGS. 1A and 1B in terms of a reactor system having two reactor beds; a first or recuperator/quenching reactor bed (7) and a second or reaction/reforming reactor bed (1). Both the reactor beds (1) and (7) contain regenerative media. The regenerative beds may comprise bedding or packing material that is effective in storing and transferring heat, such as glass or ceramic beads or spheres, metal beads or spheres, ceramic (e.g., ceramics, which may include alumina, yttria, and zirconia) or metal honeycomb materials, ceramic tubes, extruded monoliths and the like, provided they are competent to maintain integrity, functionality, and withstand long term exposure to temperatures (e.g., in excess of 1500° C., in excess of 1700° C., or even in excess of 2000° C. for operating margin).

As shown in FIG. 1A, at the beginning of the pyrolysis step of the cycle, a secondary end (5) of the second reactor bed (1), which may be referred to as the reformer, is at an elevated temperature as compared to the primary end (3) of the second reactor bed (1), and at least a portion, including the first end (9) of the first reactor bed (7) is at a lower temperature than the second end (11) of the first reactor bed (7), to provide a quenching effect for the reaction products. A hydrocarbon containing pyrolysis feed is introduced via a conduit(s) (15), into a primary end (3) of the second reactor bed (1).

The pyrolysis stream from conduit(s) (15) absorbs heat from the refractory material in second reactor bed (1) and endothermically reacts to produce a desired unsaturated hydrocarbon product, such as acetylene and/or light olefins. As this step proceeds, a shift in the temperature profile (2), as indicated by the arrow, is created based on the heat transfer properties of the system. When the reactor bed(s) is designed with adequate heat transfer capability, this profile has a relatively sharp temperature gradient, which gradient moves across the second reactor bed (1) as the step proceeds. The sharper the temperature gradient profile, the more control provided for the reaction.

The reactor products from the reaction exit the second reactor bed (1) through a secondary end (5) at an elevated temperature and pass into the first reactor bed (7) through a second end (11), and exits at a first end (9), and passes through conduit 49 for further processing. The reactor product typically comprises acetylene, light olefins (e.g., ethylene), unconverted hydrocarbons, and hydrogen. As the reactor products pass through the first reactor bed (7), the products transfer heat to the regenerative bed and are quenched or cooled to a temperature approaching the temperature of the first reactor bed (7) substantially at the first end (9), which in some embodiments are preferably approximately the same temperature as the combustion feed introduced via conduit (19) into the first reactor bed (7) during the heating step (FIG. 1B) of the cycle. As the reactor products are cooled in the first reactor bed (7), a temperature gradient (4) is created in the bed and moves across the first reactor bed (7) during this pyrolysis step. After quenching, the reactor product exits the first end (9) and is processed for separation and recovery of the various components.

The heating step of the cycle (FIG. 1B), referred to as the regeneration step, then begins with reintroduction of the first and second combustion reactants via separated conduits or channels (19) within, for example, the honeycomb reactor bedding material, which has at least one first channel and one second channel which are separated by a barrier that prevents at least a majority of a stoichiometrically reactable first reactant from reacting with the second combustion reactant within the first reactor bed (7). Preferably when the reactor bed is in the form of a honeycomb, some channels through the structure are dedicated to the first combustion reactant, while the others are dedicated to the second combustion reactant. The first and second combustion reactants pass separately through the first reactor bed (7) toward the second end (11), where they exothermically react or combust in or near a combustion mixing zone (13) of the reactor system. During this heating step, the temperature gradients (6) and (8) move across the beds as illustrated by the arrows on the exemplary graphs in FIG. 1B, similar to, but in opposite directions to the temperature gradients developed during the reaction cycle in FIG. 1A. The heat recovered from the reactor bed together with the heat of combustion in combustion mixing zone (13) is transferred to second reactor bed (1), thermally regenerating the regenerative reaction beds disposed therein.

In this heating step of the cycle, if the reactants are combustion reactants, NOx can be generated, which may not be removed without treatment. Accordingly, the process may include lines and nozzles that are utilized to provide NOx reduction fluids within the reactor during the heating step. The NOx reduction fluids may be injected within the second reactor bed (1) at a predetermined location. As an example, the NOx reduction fluid may be injected at the locations that correspond to the temperatures in the range A, as noted on the temperature gradient (8) for thermal chemistry, while the NOx reduction fluid may be injected at the locations that correspond to the temperatures in the range B, as noted on the temperature gradient (8) for catalytic chemistry. In one embodiment, the injection of NOx reduction fluid is at a fixed axial location A' (not shown) in the range A or B' (not shown), in the range B at which location the temperature increases over the course of the heating step (with movement of temperature gradient 8), and at which location there is a characteristic injection temperature defined as the time-average temperature during the heating step.

As an example, various simulations were performed related to reducing NOx levels in the combustion products of the reactor, which are discussed further below in Tables 1-3. Reactions, in this example, are carried out under isothermal conditions, with 1:1 molar diluent of ammonia ($NH_3$) in combustion product composition, as noted below. The combustion stream is a fuel and air mixture at 29.4 psig (303 kPa) pressure and exothermically reacts to generate the combustion products and a reactor temperature profile that has a peak combustion temperature of 1820° C., as further described below.

Table 1 provides the compositions for combustion products with the NOx reduction fluid injected at several different axial locations A' in the second reactor bed (1) of a regenerative pyrolysis reactor system. In this regenerative pyrolysis reactor system, the temperature immediately following combustion mixing zone (13) increases from 1730° C. to 1890° C. during the heating step. Temperature at the primary end (3) of the second reactor bed (1) increases from 240° C. to 290° C. during the heating step. A temperature profile exists within first reactor bed (1) corresponding to the decreasing temperature from end (5) to end (3), and injection location A' is positioned at a point along that profile. Temperature at location A' increases over the next heating step, and a characteristic injection temperature is defined as the time average temperature at location A' during the heating step. The NOx reduction fluid is $NH_3$, which is injected at a 1:1 molar ratio of $NH_3$ to NOx. The residence time for the combustion products as they pass through the entire second reactor (1) is 20 milliseconds. Residence times for mixtures of combustion products with NOx reduction fluid injected at locations A' range from 14 to 16 milliseconds (ms). In Tables 1-3 below, injection location A' is identified in terms of the characteristic temperature at that location. Injection at end (5) of the first reactor bed (1) is characterized by an average post-combustion temperature of 1820° C. The unreacted composition of the physical mixture of combustion products (including produced NOx) with the NOx reduction fluid in weight fraction include nitrogen ($N_2$) at 0.79966, oxygen ($O_2$) at 0.01805, water ($H_2O$) at 0.18181, nitrogen oxides (NOx) at 0.00024. The NOx reduction fluid is then injected at 0.00024 weight fraction at various locations and/or at certain temperatures within the reactor.

TABLE 1

Compositions of Combustion Products in Weight Fraction for Different Injection Locations A'

| | Injection at 1820° C. | Injection at 1660° C. | Injection at 1560° C. | Injection at 1470° C. | Injection at 1300° C. |
|---|---|---|---|---|---|
| $N_2$ | 0.79965 | 0.79968 | 0.79973 | 0.79977 | 0.79968 |
| $O_2$ | 0.01779 | 0.01783 | 0.01787 | 0.01796 | 0.01804 |
| $H_2O$ | 0.18219 | 0.18219 | 0.18216 | 0.18204 | 0.18185 |
| NOx | 0.00037 | 0.00030 | 0.00023 | 0.00016 | 0.00022 |
| $NH_3$ | 0.00000 | 0.00000 | 0.00001 | 0.00007 | 0.00021 |

As shown in this Table 1, the effectiveness of the NOx reduction fluid is influenced by the injection temperatures. At the higher injection temperatures, the $NH_3$ converts into NOx, which increases the NOx levels in the combustion products by injecting the $NH_3$ at a location that involves higher temperatures. Specifically, this result is shown by the columns with $NH_3$ injected at 1660° C. in comparison to the mixed/unreacted composition. At certain lower injection temperatures, a clear reduction in the NOx levels in the combustion products is shown. For instance, the conversion of the NOx for the $NH_3$ injection temperatures in the range of 1560° C. to 1370° C. provides a reduction of NOx. This reduction appears to lessen as the temperature drops to 1300° C. Accordingly, the injection temperatures may be preferred in the range of 1600° C. to 1000° C., or specifically in the range of 1200° C. to 1400° C.

Further, as noted above, the temperature increases over the course of the heating step (with movement of temperature gradient 8 of FIG. 1B), and at which location there is a characteristic injection temperature defined as the time-average temperature during the heating step. For this example, the injection of the NOx reduction fluid at the location A' for the average temperature of 1820° C. varied in temperature between 1731° C. and 1889° C., while the injection of the NOx reduction fluid at the location A' for the average temperature of 1660° C. varied in temperature between 1579° C. and 1753° C. Similarly, the injection of the NOx reduction fluid at the location A' for the average temperature of 1560° C. varied in temperature between 1506° C. and 1617° C., while the injection of the NOx reduction fluid at the location A' for the average temperature of 1470° C. varied in temperature between 1434° C. and 1510° C. Finally, the injection of the NOx reduction fluid at the location A' for the average temperature of 1300° C. varied in temperature between 1276° C. and 1332° C. As such, in selecting a NOx reduction fluid injection location, the range of temperatures at that location should be considered for optimal operation.

Table 2 provides the compositions for combustion products with the NOx reduction fluid injected at the respective locations A' with their characteristic temperatures, but with flow rates reduced to provide for two times the residence time of Table 1. The NOx reduction fluid is $NH_3$, which is injected at a 1:1 molar ratio of $NH_3$ to NOx for the various injection temperatures. The residence time for the combustion products are twice the residence times of Table 1.

TABLE 2

Compositions of Combustion Products in Weight Fraction for Different Injection Locations at Two Times the Residence Times

|  | Injection at 1470° C. | Injection at 1390° C. | Injection at 1300° C. |
| --- | --- | --- | --- |
| $N_2$ | 0.79972 | 0.79978 | 0.79974 |
| $O_2$ | 0.01787 | 0.01794 | 0.01801 |
| $H_2O$ | 0.18218 | 0.18209 | 0.18195 |
| NOx | 0.00022 | 0.00015 | 0.00016 |
| $NH_3$ | 0.00000 | 0.00004 | 0.00014 |

As shown in this Table 2, the effectiveness of the injection of the NOx reduction fluid is also dependent on the residence time of the combustion products. That is, the residence time is a factor to be considered to along with the temperature. The column with $NH_3$ injected at 1390° C. provides the most NOx reduction, while the columns that have the $NH_3$ injected at 1470° C. and 1300° C. provide some reduction in the NOx. Accordingly, based on the residence time, certain temperatures may be preferred to manage the NOx levels.

Table 3 provides the compositions for combustion products with the NOx reduction fluid injected at locations A' with their characteristic temperatures, but with flow rates reduced to provide for five times the residence time in Table 1. The NOx reduction fluid is $NH_3$, which is injected at a 1:1 molar ratio of $NH_3$ to NOx for various temperatures. The residence time for the combustion products are five times the residence times of Table 1.

TABLE 3

Compositions of Combustion Products in Weight Fraction for Different Injection Locations at Five Times the Residence Times

|  | Injection at 1470° C. | Injection at 1390° C. | Injection at 1300° C. | Injection at 1220° C. |
| --- | --- | --- | --- | --- |
| $N_2$ | 0.79971 | 0.79972 | 0.79976 | 0.79976 |
| $O_2$ | 0.01785 | 0.01788 | 0.01792 | 0.01799 |
| $H_2O$ | 0.18218 | 0.18218 | 0.18217 | 0.18204 |
| NOx | 0.00026 | 0.00022 | 0.00015 | 0.00013 |
| $NH_3$ | 0.00000 | 0.00000 | 0.00001 | 0.00009 |

As shown in this Table 3, the dependency of the NOx reduction fluid injection temperature on the residence time is further supported by the values in this table. As shown by the column with $NH_3$ injected at 1470° C., the injection temperature of 1470° C., which was acceptable in Table 1, converts $NH_3$ into NOx, at this residence time. As a result, the NOx levels may be increased in the combustion products for this injection temperature and associated residence time. At certain lower injection temperatures, a clear reduction in the NOx levels in the combustion products is shown. For instance, the conversion of the NOx for the $NH_3$ injection temperatures in the range of 1390° C. to 1220° C. provide a reduction of NOx levels. Accordingly, the NOx reduction fluid injection may be adjusted based on the injection temperature and residence time for the process.

Figure 2:
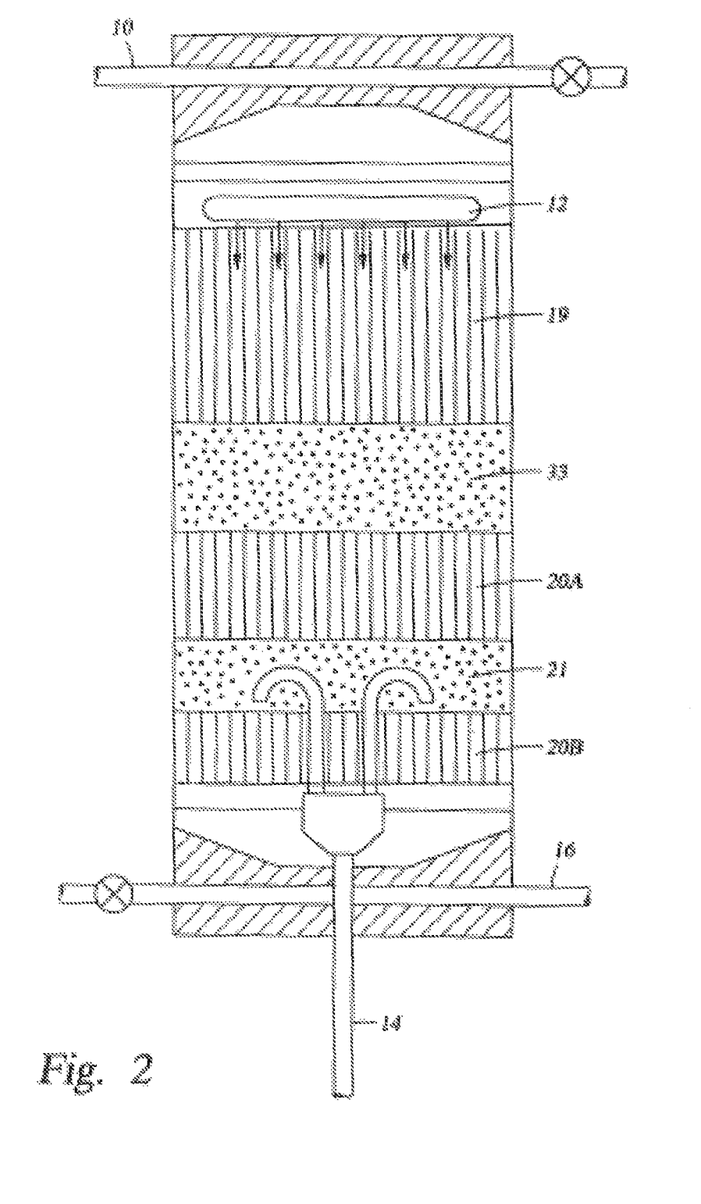
FIG. 2 is a diagrammatic illustration of a pyrolysis reactor in accordance with an embodiment of the present techniques.

FIG. 2 is a diagrammatic illustration of a pyrolysis reactor in accordance with an embodiment of the present techniques. In this embodiment, the reactor beds (1) and (7) are honeycomb monoliths. In the primary end of second reactor bed (1), a NOx reduction mixing zone (21) is provided upstream of a final portion of the honeycomb/channels (20) and downstream of the mixing components (33). The NOx reduction mixing zone includes a NOx reduction inlet conduit (14), which is coupled to a NOx reduction fluid source (not shown). A portion of the final honeycomb/channels (20) are dedicated to provide the NOx reduction fluid, which may be $NH_3$, into the NOx reduction mixing region (21) in a direction countercurrent to the general reactor flow, direction A, in this heating step of the overall cycle in the hydrocarbon processing mode.

In FIG. 2, air enters through inlet conduit (10) and is directed toward honeycomb/channels (19) in first reactor bed (7). A separate fuel inlet (12) permits flow of fuel, such as for example hydrogen gas ($H_2$), into the top of honeycomb/channels (19), and through dedicated fuel conduits in the first reactor bed (7). The inlet air and fuel flows continue through the honeycomb/channels, absorbing heat as they proceed, and enter the combustion mixing zone (13), wherein the combustion reaction occurs to provide heat and combustion products, which are then passed into the honeycomb/channels (20A) of second reactor bed (1). As noted above, the combustion products may include NOx gases, such as NO, $NO_2$, $N_2O$ and $N_2O_4$. The combustion products then enter the NOx reduction mixing zone (21), wherein they are mixed with NOx reduction fluid (e.g., $NH_3$) entering through inlet conduit (14). Accordingly, the thermal DeNOx reaction begins in this mixing zone (21). The reacted NOx products, primarily $N_2$ and $H_2O$, are redirected into final honeycomb/channels (20B), collected and exhausted through combustion product line (16) along with other combustion products.

Figure 3:
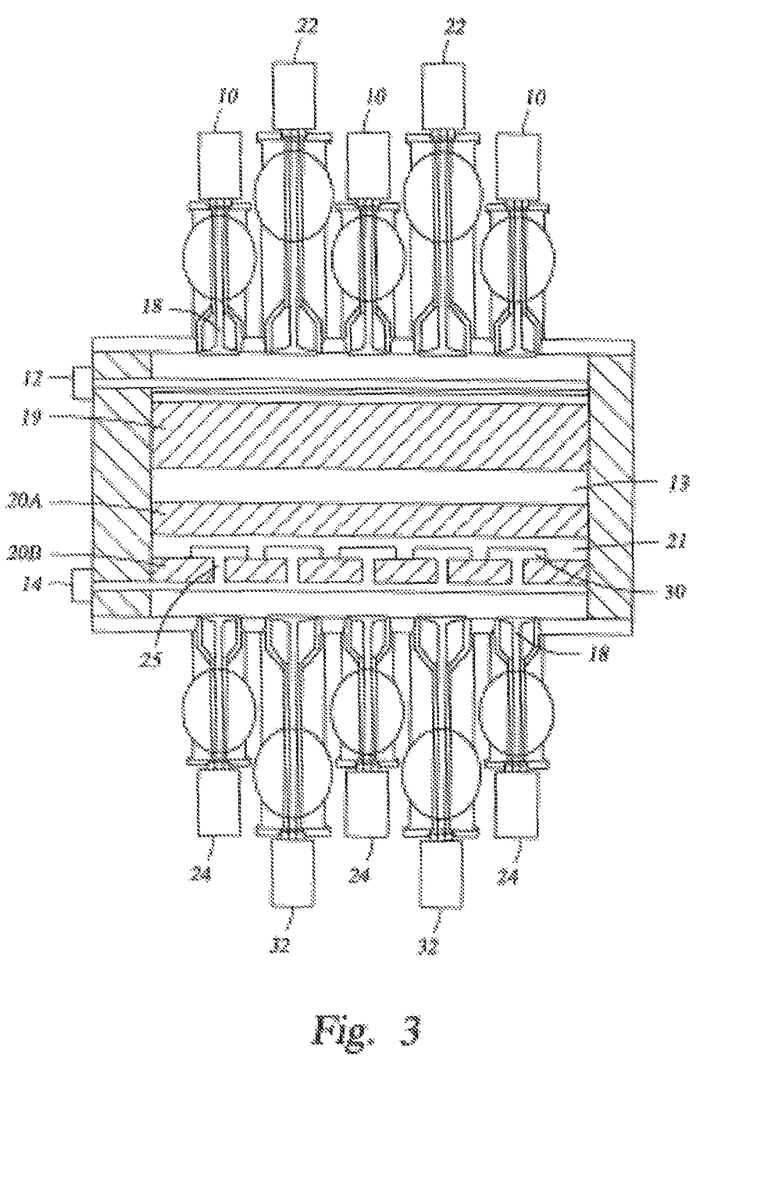
FIG. 3 is an alternative diagrammatic illustration of a pyrolysis reactor in accordance with an embodiment of the present techniques.

FIG. 3 is an alternative diagrammatic illustration of a pyrolysis reactor in accordance with an embodiment of the present techniques. In this configuration, a series of automatically actuated poppet valves (18) control the flow direction within the reactor. In the heating step, an oxidant stream enters through valves (10), with reactor product removal valves (22) in the closed positions, as are the pyrolysis feed inlet valves (24). In this step, the combustion removal valves (32) are also open. Fuel enters the reactor through a side inlet (12), oxidant and fuel travel essentially in separate channels through bed 19, and the air/fuel gases are again mixed in central region (13). Combustion products resulting from the air/fuel reaction continue into the first part of the reform bed (20A). A series of final mixers 30 are provided in a NOx reduction mixing zone (21), which are downstream of the honeycomb (20A), and a series of NOx reduction sparger conduits (25), fed by NOx reduction inlet conduit (14), are positioned between the final mixers (30). The NOx reduction fluid (e.g., ammonia) enters the reactor in a direction countercurrent to the overall reactor flow, and due to the series of dedicated spargers for uniformly distributed within the reactor, to provide mixing with combustion products exiting the first part of the bed (20A). Similar to the process described for FIG. 2, a thermal DeNOx reaction begins in the NOx reduction mixing zone (21), continues in channels of the honeycomb (20B) and the reacted NOx products are exhausted through open combustion removal actuated poppet valves (32).

Figure 4:
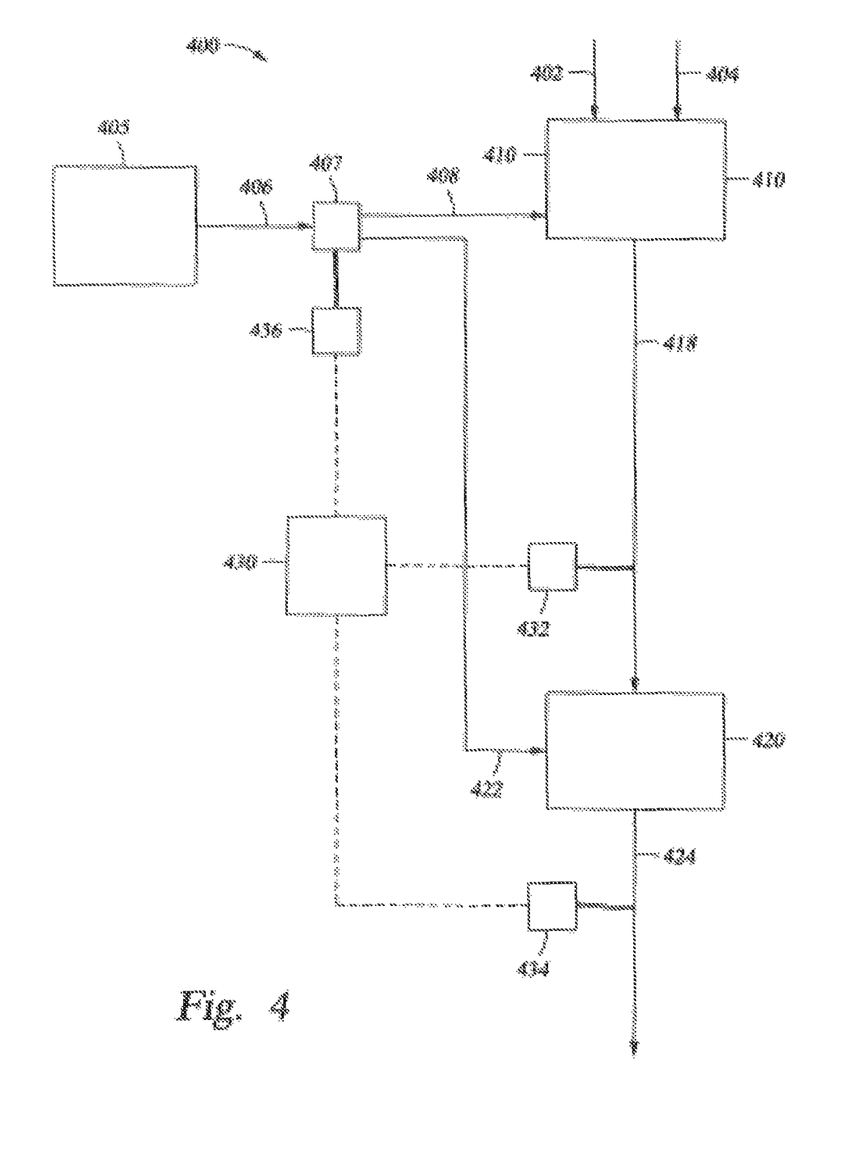
FIG. 4 is a diagrammatic illustration of a pyrolysis system in accordance with an embodiment of the present techniques.

Moreover, as noted above, the NOx reduction fluid may be utilized at different steps of the process. FIG. 4 is a diagrammatic illustration of a pyrolysis system in accordance with an embodiment of the present techniques. In this system 400, a pyrolysis reactor 410 is coupled to an external NOx tower 420 and a NOx reduction fluid source 405 to further process the combustion products. Further, the system 400 include a process control unit 430 coupled to various measurements devices 434 and 432 and a control unit 436 to manage the NOx levels in the combustion products from the system 400.

In this configuration 400, a fuel is provided via line 402 and an oxidant via line 404. The fuel and oxidant may be combined together in a mixing zone in the pyrolysis reactor 410, as discussed above, to heat at least a portion of the interior of the pyrolysis reactor and produce combustion products. A NOx reduction fluid may be added to the combustion products within the pyrolysis reactor 410, which may be similar to the embodiments described above. The NOx reduction fluid may be provided from a NOx reduction fluid unit 405 to the pyrolysis reactor 410 via lines 406 and 408 and valve assembly 407. The valve assembly 407 may include a valve for line 408 and/or a valve for line 422, as an example. The combustion products may be provided via line 418 to the external NOx tower 420. The external NOx tower 420 may involve any NOx reduction technology and may include the addition of NOx reduction fluid to the external NOx tower 420 via 422 from the NOx reduction fluid source 405. For instance, the external NOx tower 420 may involve catalytic processes, such as Selective Catalytic Reduction (SCR). Other embodiment may include the external NOx tower 420 using adsorption, absorption, oxidation, chemical reduction and any combination thereof. The resulting combustion product may be passed via line 424 for further processing.

As an example, if the pyrolysis reactor 410 is a regenerative reverse flow reactor, the operating temperatures within the pyrolysis reactor 410 may be in the range of 1200° C. and 2200° C., preferably between 1400° C. and 1900° C., or in the range of 1540° C. and 1650° C. Accordingly, the NOx reduction fluid may be injected via line 408 downstream of the mixing zone at temperatures in the range of 1600° C. to 1000° C. or even in the range of 1400° C. to 1200° C. The location of the NOx reduction fluid may be adjusted based on the temperature and residence time, as noted above. Regardless, the combustion products may exit the pyrolysis reactor 410 in the temperature range from 200° C. to 500° C., which is provided to the external NOx tower 420 for catalytic processing.

The NOx reduction fluid may be provided to the system based on various parameters. For instance, the NOx reduction fluid may be provided based on a predetermined period of time (e.g., provided every cycle or for a portion of the cycle). Also, the NOx reduction fluid may be provided based on a predetermined composition of the feed and estimated amount of NOx to be produced. For instance, the amount of NOx reduction fluid may be based on the composition of the hydrocarbon feed and estimated NOx production.

As an alternative embodiment, a control mechanism may be utilized to manage the NOx reduction process. That is, the NOx reduction fluid may be managed by adjusting the period of supply or the amount of NOx reduction fluid provided to the pyrolysis reactor 410 or the external NOx tower 420. To provide this management of the NOx reduction techniques, a process control unit 430 may be utilized along with a flow control unit 436 and composition measurement devices 432 and 434. These units may communicate via wireless or physical media, as shown by the dashed lines in FIG. 4.

The process control unit 430 may include a computer system along with one or more monitors and input/output components. The computer system may include memory to store sets of instructions and operational data and a processor to execute the instructions and access the operational data. In this system, operational settings may be adjusted to manage or refine the processing of the combustion products to manage the NOx levels in the resulting combustion products. For instance, operational settings may be adjusted in the system to further control the amount NOx reduction fluid provided to the pyrolysis reactor 410 and/or the external NOx tower 420. These operating parameters may include monitored values, which are stored as operational data in the memory, and utilized by the processor in executing one or more sets of instructions to monitor the composition and flow of NOx reduction fluid to various units, to determine adjustments to flow rates and other similar operations. As an example, the process control unit 430 may be configured to receive measurement data from composition measurement devices 432 and 434 that communicates measurement data to process control unit 430; compare the measurement data with stored operation parameters and calculate an adjustment to the flow rate of the NOx reduction fluid to be provided via the flow control unit 436; and communicate the adjustment to the flow control unit 436.

Along with the process control unit 430, the control mechanism may include different types of measurement devices, such as composition measurement devices 432 and 434. The composition measurement devices 432 and 434, which may include densitometer, nuclear magnetic resonance (NMR) spectrometer or offline gravimetric analyzer (ASTM D1018, D3343, D4808, D5291, D7171) and may be configured to measure the NOx content of the stream (e.g., combustion products in line 418 or 424) and communicate the measurements to the process control unit 430. For example, a reactor composition measurement device 432 may be disposed within the end of the reactor near the line 418 or at a location along line 418 to monitor the composition of the stream passing through line 418, while a tower composition measurement device 434 may be disposed within the end of the tower 420 near the line 424 or at a location along line 424 to monitor the composition of the stream passing through line 424.

The flow control unit 436 may include one or more different control units to adjust different operational settings. For example, a flow control unit 436 may be utilized and configured to adjust the amount of a NOx reduction fluid passed to the pyrolysis reactor 410 and/or the external NOx tower 420, receive adjustments to flow rates and/or communicate operational settings to the process control unit 430. As an example, the flow control unit 436 may be coupled to a valve assembly 407 that includes one or more valves.

The present techniques may monitor certain operating parameters and adjust operational settings to provide an enhanced process. For instance, the control mechanism may include a reactor composition measurement device 432 configured to measure NOx content of the combustion products prior to the external NOx tower 420. The control mechanism may also include a process control unit having a set of instructions stored in memory and accessed via a processor, which are configured to (i) receive operational parameters from the reactor composition measurement device 432; (ii) to calculate the amount of NOx reduction fluid to be provided to the external NOx tower 420 via line 422 or to the pyrolysis reactor 410 via line 408; and provide an indication to a flow control unit 436 to adjustment to the flow rate of the NOx reduction fluid based on the determined flow rate.

The present techniques may monitor certain operating parameters and adjust operational settings to provide an enhanced process. To manage the operation, operating parameters may be monitored and adjusted to vary the flow rate of the NOx reduction fluid. The operating parameters may include composition of the combustion products (e.g., streams in the line 418 or 424). These operating parameters may be monitored, stored in memory as operational data, and utilized to adjust operational settings, which may be stored in memory, via a computer system. The determination of the flow rate may be calculated by the computer system in the process control unit 430, which may be adjusted in real time or concurrently with the processing of the combustion products, depending on the specific configuration.

For instance, the control mechanism may include a reactor composition measurement device 432 configured to measure NOx content of the combustion products prior to the external NOx tower 420. The control mechanism may also include a process control unit having a set of instructions stored in memory and accessed via a processor, which are configured to (i) receive operational parameters from the reactor composition measurement device 432; (ii) to calculate the amount of NOx reduction fluid to be provided to the external NOx tower 420 via line 422 or to the pyrolysis reactor 410 via line 408; and/or (iii) provide an indication to a flow control unit 436 to adjustment to the flow rate of the NOx reduction fluid based on the determined flow rate.

As another example, the control mechanism may include a tower composition measurement device 434 configured to measure NOx content of the combustion products exiting the external NOx tower 420. The control mechanism may also include a process control unit 430 having a set of instructions stored in memory and accessed via a processor, which are configured to (i) receive operational parameters from the tower composition measurement device 434; (ii) to calculate the amount of NOx reduction fluid to be provided to the external NOx tower 420 via line 422 or to the pyrolysis reactor 410 via line 408; and/or (iii) provide an indication to a flow control unit 436 to adjust the flow rate based on the determination.

Based on the operational data from these measuring devices, the process control unit 430 may calculate an adjustment to the flow rate for the NOx reduction fluid. This may involve a comparison of the operational data (e.g., flow rates for this example) and the desired composition level, which may be a difference comparison or other suitable calculation.

Based on the comparison, the process control unit 430 may adjust the one or more flow valves coupled along the lines 408 or 422 to increase or decrease the flow. As another possible adjustment, if the valve assembly is a manifold or other device with one or more valves for each of the lines 408 or 422, the control mechanism may adjust the flow rate to the pyrolysis reactor 410 or external NOx tower 420. Accordingly, in this configuration, the flow rate may be used to manage the NOx production.

Beneficially, the proposed configuration may be utilized to provide an enhanced NOx reduction process that utilizes NOx reduction within the pyrolysis reactor along with external NOx reduction techniques. The combination of NOx reduction techniques may efficiently manage the NOx production.

In an alternative embodiment, at least a portion of the final honeycomb/channel structure (20) is washcoated with the above-described catalytic DeNOx catalysts. In this manner, the present techniques can accomplish either selective catalytic reduction or selective non-catalytic reduction of NOx, or both. Further, the final honeycomb/channel structure (20) may be impregnated with the above-described catalytic DeNOx catalysts in other embodiments.

The ammonia can be delivered to the process at 1-1.5 stoichiometric excess, and the process can be operated with either an excess of oxidant (oxygen or air) or an excess of combustion fuel (e.g., hydrogen or methane).

Other embodiments are listed below:

E1. A process comprising mixing a NOx reduction fluid with combustion products within a regenerative pyrolysis reactor downstream of a combustion mixing zone, wherein the NOx reduction fluid reacts with NOx contained in the combustion products to reduce the amount of NOx in the combustion products.

E2. The process of paragraph E1, further comprising:
passing one or more combustion streams through a reactor bed in a first direction during a heating step; and
reacting the combustion streams within the combustion mixing zone to form the combustion products.

E3. The process of paragraph E2, further comprising passing the NOx reduction fluid in a counter-current direction into a NOx mixing zone to mix the NOx reduction fluid with the combustion products.

E4. The process of any one of paragraphs E2 to E3, wherein the NOx reduction fluid is introduced through a sparger downstream of the combustion mixing zone.

E5. The process of any one of paragraphs E1 to E4, wherein the NOx reduction fluid is mixed with the combustion products at a temperature in the range of 1000° C. to 1600° C.

E6. The process of any one of paragraphs E1 to E4, wherein the NOx reduction fluid is mixed with the combustion products at a temperature in the range of 1200° C. to 1400° C.

E7. The process of any one of paragraphs E1 to E6, wherein the NOx reduction fluid is ammonia.

E8. The process of any one of paragraphs E1 to E7, wherein the pyrolysis regenerative reactor is a reverse-flow regenerative pyrolysis reactor.

E9. The process of any one of paragraphs E1 to E8, further comprising:
monitoring the composition of the combustion products downstream of the reactor; and
adjusting the flow rate of the NOx reduction fluid to the reactor based on the monitored composition.

E10. The process of any one of paragraphs E1 to E9, further comprising:

passing the combustion products to an external NOx tower downstream of the reactor; and reducing the amount of NOx contained in the combustion products in the external NOx tower.

E11. The process of paragraph E10, comprising providing NOx reduction fluid to the external NOx tower to reduce the amount of NOx contained in the combustion products.

E12. The process of any one of paragraphs E10 to E11, further comprising:

monitoring the composition of the combustion products downstream of the reactor; and adjusting the flow rate of the NOx reduction fluid to the external NOx tower based on the monitored composition.

E13. The process of any one of paragraphs E1 to E12, wherein the regenerative pyrolysis reactor is operated at temperatures from 1200° C. to 2200° C. and pressures from 28 kPa to 1034 kPa.

E14. The process of any one of paragraphs E1 to E13, comprising passing the NOx reduction fluid and combustion products over a catalyst within the regenerative pyrolysis reactor downstream of the combustion mixing zone, wherein the catalyst promotes reactions between the combustion products and the NOx reduction fluid to reduce the NOx contained in the combustion products.

E15. The process of paragraph E14, wherein the catalyst is a sulfide selected from the group consisting of elements from Group VIIIB, VB, VIB and combinations thereof.

E16. The process of paragraph E14, wherein the catalyst is disposed within a honeycomb refractory material.

E17. The process of paragraph E14, wherein the NOx reduction fluid is passed over the catalyst with the combustion products at a temperature in the range of 100° C. to 600° C.

E18. The process of any one of paragraphs E2 to E17, further comprising:

passing a pyrolysis stream through the regenerative pyrolysis reactor; and exposing the pyrolysis stream to heat within the regenerative pyrolysis reactor to produce a reactor product comprising ethylene and acetylene.

E19. The process of paragraph E18, further comprising exposing at least a portion of the pyrolysis stream to peak pyrolysis gas temperatures in the range of 1400° C. to 2200° C., at a residence time within the regenerative pyrolysis reactor between 0.5 second and 0.001 second.

E20. The process of any one of paragraphs E2 to E19, wherein the combustion streams comprise a first combustion feed and a second combustion feed that are separately heated within the regenerative pyrolysis reactor prior to the reacting step.

E21. A pyrolysis system comprising:

a regenerative pyrolysis reactor having a combustion mixing zone within the regenerative pyrolysis reactor;

a NOx reduction mixing zone within the regenerative pyrolysis reactor; and a NOx reduction fluid source in fluid communication with the regenerative pyrolysis reactor and configured to provide a NOx reduction fluid to the NOx reduction mixing zone of the regenerative pyrolysis reactor.

E22. The pyrolysis system of paragraph E21, wherein the regenerative pyrolysis reactor comprises a first reactor bed coupled in series with a second reactor bed, and a NOx sparger disposed within the second reactor bed and configured to provide the NOx reduction fluid to the NOx reduction mixing zone of the regenerative pyrolysis reactor.

E23. The pyrolysis system of paragraph E22, wherein the NOx sparger is positioned to direct the NOx reduction fluid in a counter-current direction from the combustion products.

E24. The pyrolysis system of any one of paragraphs E22 to E23, wherein the at least a portion of the surfaces in the regenerative pyrolysis reactor downstream of the combustion mixing zone have a catalytic coating configured to promote the reaction of the NOx reduction fluid with combustion products.

E25. The pyrolysis system of paragraph E24, wherein the catalyst is a sulfide selected from the group consisting of elements from Group VIIIB, VB, VIB and combinations thereof.

E26. The pyrolysis system of any one of paragraphs E21 to E25, wherein the regenerative pyrolysis reactor is a regenerative reverse-flow reactor.

E27. The pyrolysis system of paragraph E26, wherein the regenerative reverse-flow reactor comprises a reactor body having a reaction zone; a packing material disposed within the reaction region; and one or more poppet valve assemblies coupled to the reactor body and in flow communication with the reaction zone for controlling fluid flow between a location external to the reactor body and within the reaction region.

E28. The pyrolysis system of paragraph E26, wherein the catalyst is disposed within a honeycomb refractory material.

E29. The pyrolysis system of any one of paragraphs E21 to E28, further comprising:

a reactor composition measurement device downstream of the regenerative pyrolysis reactor and configured to monitor the composition of the combustion products downstream of the regenerative pyrolysis reactor and transmit the reactor monitored data; and a process control unit in communication with the reactor composition measurement device and configured receive the reactor monitored data, determine the NOx content of the combustion products, and indicate an adjustment to a flow rate of the NOx reduction fluid to the regenerative pyrolysis reactor based on the determined NOx content.

E30. The pyrolysis system of paragraph E29, further comprising a flow control unit in communication with the process control unit and configured receive the indication and adjust the flow rate of the NOx reduction fluid to the regenerative pyrolysis reactor based on the indication.

E31. The pyrolysis system of any one of paragraphs E21 to E30, further comprising an external NOx tower downstream of the regenerative pyrolysis reactor and configured to reduce the amount of NOx contained in the combustion products from the regenerative pyrolysis reactor.

E32. The pyrolysis system of paragraph E31, wherein the external NOx tower is configured to receive NOx reduction fluid from the NOx reduction fluid source.

E33. The pyrolysis system of paragraph E32, further comprising:

a tower composition measurement device downstream of the external NOx tower and configured to monitor the composition of the combustion products downstream of the external NOx tower and transmit the tower monitored data; and a process control unit in communication with the reactor composition measurement device and configured receive the tower monitored data, determine the NOx content of the combustion products, and indicate an adjustment to a flow rate of the NOx reduction fluid to the external NOx tower based on the determined NOx content.

E34. The pyrolysis system of paragraph E33, further comprising a flow control unit in communication with the process control unit and configured receive the indication and adjust the flow rate of the NOx reduction fluid to the external NOx tower based on the indication.

The invention has been described above with reference to numerous embodiments and specific examples. Many variations will suggest themselves to those skilled in this art in light of the above detailed description. All such obvious variations are within the full intended scope of the appended claims.

What is claimed is:

1. A process comprising:
mixing a NOx reduction fluid with combustion products within a regenerative thermal pyrolysis reactor downstream of a combustion mixing zone, wherein the NOx reduction fluid reacts with NOx contained in the combustion products to reduce the amount of NOx in the combustion products; and
monitoring the composition of the combustion products downstream of the regenerative thermal pyrolysis reactor; and
adjusting the flow rate of the NOx reduction fluid to the regenerative thermal pyrolysis reactor based on the monitored composition.

2. The process of claim 1, further comprising:
passing one or more combustion streams through a reactor bed in a first direction during a heating step; and
reacting the combustion streams within the combustion mixing zone to form the combustion products.

3. The process of claim 2, further comprising passing the NOx reduction fluid in a counter-current direction into a NOx mixing zone to mix the NOx reduction fluid with the combustion products.

4. The process of claim 2, further comprising:
passing a pyrolysis stream through the regenerative thermal pyrolysis reactor; and
exposing the pyrolysis stream to heat within the regenerative thermal pyrolysis reactor to produce a reactor product comprising ethylene and acetylene.

5. The process of claim 4, further comprising exposing at least a portion of the pyrolysis stream to peak pyrolysis gas temperatures in the range of 1400° C. to 2200° C., at a residence time within the regenerative thermal pyrolysis reactor between 0.5 second and 0.001 second.

6. The process of claim 2, wherein the combustion streams comprise a first combustion feed and a second combustion feed that are separately heated within the regenerative thermal pyrolysis reactor prior to the reacting step.

7. The process of claim 1, wherein the NOx reduction fluid is mixed with the combustion products at a temperature in the range of 1000° C. to 1600° C.

8. The process of claim 1, wherein the NOx reduction fluid is mixed with the combustion products at a temperature in the range of 1200° C. to 1400° C.

9. The process of claim 1, wherein the NOx reduction fluid is ammonia.

10. The process of claim 1, further comprising:
passing the combustion products to an external NOx tower downstream of the regenerative thermal pyrolysis reactor; and
reducing the amount of NOx contained in the combustion products in the external NOx tower.

11. The process of claim 10, comprising providing NOx reduction fluid to the external NOx tower to reduce the amount of NOx contained in the combustion products.

12. The process of claim 10, further comprising:
monitoring the composition of the combustion products downstream of the regenerative thermal pyrolysis reactor; and
adjusting the flow rate of the NOx reduction fluid to the external NOx tower based on the monitored composition.

13. A process comprising:
mixing a NOx reduction fluid with combustion products within a regenerative thermal pyrolysis reactor downstream of a combustion mixing zone, wherein the NOx reduction fluid reacts with NOx contained in the combustion products to reduce the amount of NOx in the combustion products; and
passing the NOx reduction fluid and combustion products over a catalyst within the regenerative thermal pyrolysis reactor downstream of the combustion mixing zone, wherein the catalyst promotes reactions between the combustion products and the NOx reduction fluid to reduce the NOx contained in the combustion products.

14. The process of claim 13, wherein the catalyst is a sulfide selected from the group consisting of elements from Group VIIIB, VB, VIB and combinations thereof.

15. The process of claim 13, wherein the NOx reduction fluid is passed over the catalyst with the combustion products at a temperature in the range of 100° C. to 600° C.

16. A pyrolysis system comprising:
a regenerative thermal pyrolysis reactor having a combustion mixing zone within the regenerative thermal pyrolysis reactor; and a NOx reduction mixing zone within the regenerative thermal pyrolysis reactor; and
a NOx reduction fluid source in fluid communication with the regenerative thermal pyrolysis reactor and configured to provide a NOx reduction fluid to the NOx reduction mixing zone of the regenerative thermal pyrolysis reactor;
wherein the at least a portion of the surfaces in the regenerative thermal pyrolysis reactor downstream of the combustion mixing zone have a catalytic coating configured to promote the reaction of the NOx reduction fluid with combustion products.

17. The pyrolysis system of claim 16, wherein the regenerative thermal pyrolysis reactor comprises a first reactor bed coupled in series with a second reactor bed, and a NOx sparger disposed within the second reactor bed and configured to provide the NOx reduction fluid to the NOx reduction mixing zone of the regenerative thermal pyrolysis reactor.

18. The pyrolysis system of claim 17, wherein the NOx sparger is positioned to direct the NOx reduction fluid in a counter-current direction from the combustion products.

19. The pyrolysis system of claim 16, wherein the catalyst is a sulfide selected from the group consisting of elements from Group VIIIB, VB, VIB and combinations thereof.

20. The pyrolysis system of claim 16, wherein the regenerative thermal pyrolysis reactor is a regenerative reverse-flow reactor having a reactor body having a reaction zone; a packing material disposed within the reaction region; and one or more poppet valve assemblies coupled to the reactor body and in flow communication with the reaction zone for controlling fluid flow between a location external to the reactor body and within the reaction region.

21. The pyrolysis system of claim 16, further comprising an external NOx tower downstream of the regenerative thermal pyrolysis reactor and configured to reduce the amount of NOx contained in the combustion products from the regenerative thermal pyrolysis reactor.

22. The pyrolysis system of claim 21, further comprising:
a tower composition measurement device downstream of the external NOx tower and configured to monitor the composition of the combustion products downstream of the external NOx tower and transmit the tower monitored data; and
a process control unit in communication with the reactor composition measurement device and configured receive the tower monitored data, determine the NOx content of the combustion products, and indicate an adjustment to a flow rate of the NOx reduction fluid to the external NOx tower based on the determined NOx content.

23. A pyrolysis system comprising:
a regenerative thermal pyrolysis reactor having a combustion mixing zone within the regenerative thermal pyrolysis reactor; and a NOx reduction mixing zone within the regenerative thermal pyrolysis reactor;
a NOx reduction fluid source in fluid communication with the regenerative thermal pyrolysis reactor and configured to provide a NOx reduction fluid to the NOx reduction mixing zone of the regenerative thermal pyrolysis reactor;
a reactor composition measurement device downstream of the regenerative thermal pyrolysis reactor and configured to monitor the composition of the combustion products downstream of the regenerative thermal pyrolysis reactor and transmit the reactor monitored data; and
a process control unit in communication with the reactor composition measurement device and configured receive the reactor monitored data, determine the NOx content of the combustion products, and indicate an adjustment to a flow rate of the NOx reduction fluid to the regenerative thermal pyrolysis reactor based on the determined NOx content.

* * * * *